Aug. 11, 1964  F. A. HAMILTON  3,144,497
RADIATION SENSITIVE GROUND SPEED INDICATOR
Original Filed Sept. 29, 1958  5 Sheets-Sheet 1

INVENTOR:
Fredrick A. Hamilton
BY Louis Bernal
ATTORNEY

Aug. 11, 1964  F. A. HAMILTON  3,144,497
RADIATION SENSITIVE GROUND SPEED INDICATOR
Original Filed Sept. 29, 1958  5 Sheets-Sheet 2

INVENTOR:
Fredrick A. Hamilton
BY
ATTORNEY

Fig. 6

Aug. 11, 1964    F. A. HAMILTON    3,144,497
RADIATION SENSITIVE GROUND SPEED INDICATOR
Original Filed Sept. 29, 1958    5 Sheets-Sheet 4

Fig.7

INVENTOR:
Fredrick A. Hamilton
BY Louis Bernet
ATTORNEY

United States Patent Office 3,144,497
Patented Aug. 11, 1964

3,144,497
RADIATION SENSITIVE GROUND SPEED INDICATOR
Fredrick A. Hamilton, Cincinnati, Ohio, assignor to Chicago Aerial Industries, Inc., Barrington, Ill., a corporation of Delaware
Original application Sept. 29, 1958, Ser. No. 763,895, now Patent No. 2,995,662, dated Aug. 8, 1961. Divided and this application May 22, 1961, Ser. No. 111,789
13 Claims. (Cl. 88—1)

This invention relates generally to electro-optical measuring apparatus and more particularly to new and improved circuitry responsive to relative motion between the measuring apparatus and a target area for providing indications of desired characteristics, such as velocity and range. This application is a division of my co-pending application Serial No. 763,895, filed September 29, 1958, now issued as Patent Number 2,995,662.

Velocity responsive devices for indicating vehicular speed have heretofore been known and used in both surface and air vehicles. Several of these prior art devices are electro-optical in nature. Those skilled in the art know, however, that the problems posed by modern day vehicles, and in particular high speed aerial vehicles, are such that the electro-optical systems previously required to determine angular ground speed are not entirely satisfactory due to their cost and complexity. Furthermore, these devices are limited by the grids or optical gratings which they employ to modulate the accepted radiations, since such grids reduce the sensitivity of the devices by blocking a considerable portion of the impinging radiations.

Still further, those skilled in the art will appreciate that no relatively simple automatic means for ascertaining linear ground speed has heretofore been available. It is recognized that if sufficient knowledge of terrain clearance is obtained, linear ground speed can be determined from angular ground speed. Manifestly, this scheme is not entirely satisfactory since it requires not only a separate determination of terrain clearance, but in addition it requires some satisfactory means of multiplying the angular ground speed by the determined value of terrain clearance. Clearly, such an approach does not lend itself to simple, automatic operation.

Accordingly, it is a general object of this invention to overcome the above-described prior art limitations by providing new and improved velocity responsive measuring and indicating apparatus.

It is another object of this invention to provide new and improved velocity responsive measuring and indicating apparatus capable of accepting and utilizing all of the incident radiations, thereby providing a substantial gain in sensitivity over the devices of the prior art.

It is still another object of this invention to provide new and improved velocity responsive apparatus, as described above, which finds advantageous use in measuring relative ground speed and range of aerial vehicles.

It is still a further object of this invention to provide new and improved velocity responsive apparatus, as described above, comprising relatively simple, automatically operating means for indicating the angular or linear ground speed of aerial vehicles.

It is a still further object of this invention to provide a new and improved velocity responsive apparatus characterized by its accuracy, flexibility and relatively low cost of construction and operation.

These and other objects are realized in accordance with the features of a specific illustrative embodiment of the invention which comprises a pair of radiation sensitive elements advantageously taking the form of light sensitive or infra-red sensitive cells. In one preferred use of the invention wherein the angular or linear ground speed of an aerial vehicle is to be measured, the two-radiation sensitive elements are positioned on the vehicle in spaced-apart, co-planar relation for producing electrical signals representative of the radiations received from the terrain below the vehicle. In accordance with a feature of the invention, the electrical signals produced by the elements to represent any given target area of terrain are applied from the elements to the measuring circuit in temporal or time-spaced fashion, the time period between successive signals for a given target area being determined by the angle of acceptance for the cone of view of each element, the included angle between the elements, the height of the aerial vehicle and the speed of travel of the vehicle.

In the illustrative embodiment of the invention being described, the output signals from one radiation sensitive element are fed to a comparison circuit and the output signals from the other radiation sensitive element are fed to a variable time delay, which in turn, applies the signals to the comparison circuit. It is a feature of this invention that the output of the comparison circuit controls the delay period of the variable time delay so that when the signals applied to comparison circuit are not in coincidence, the comparison circuit error signal controls the time delay period to automatically bring these signals into coincidence. A signal generator is operated by this error signal to provide an indicating signal proportional to the vehicle speed.

It is a further feature of the invention that the variable time delay advantageously takes the form of a magnetic drum information storage device wherein the variable delay is achieved by varying the speed of rotation of the drum, or alternatively, rotating the drum at a constant speed and varying the position of the playback head in accordance with the control signal from the comparison circuit. However, it will be readily understood by those skilled in the art that, depending upon the duration of delays involved, the variable time delay may, with equally advantageous results, take other forms such as a delay line or an electronic time delay circuit.

In accordance with a further feature, the principles of the invention may be embodied to provide automatic indication of the range of a moving object. In this illustrative embodiment, the two radiation sensitive devices advantageously are positioned a fixed distance apart to establish a datum axis. One element is located at right angles to that axis, while the second element is rotatably mounted to take various positions co-planar with the first element.

The signal outputs of the two elements are applied to a signal comparison circuit; and the output control signal of the comparison circuit is, in the proximate vicinity of coincidence, proportional to the lack of coincidence between the input signals. This control signal energizes a suitable motor to adjust the angle of the second element so the signal from the two elements are coincident, as indicated by a null from the comparison circuit. Such coincidence indicates that both radiation sensitive elements are responsive to the same terrain scene or the same portions of a moving target. When coincidence exists, the value of the angle taken by the second sensor is used to determine the distance to the target.

Other features and advantages of this invention will be apparent from the following description, taken in connection with the accompanying drawing, in which.

Figure 1:
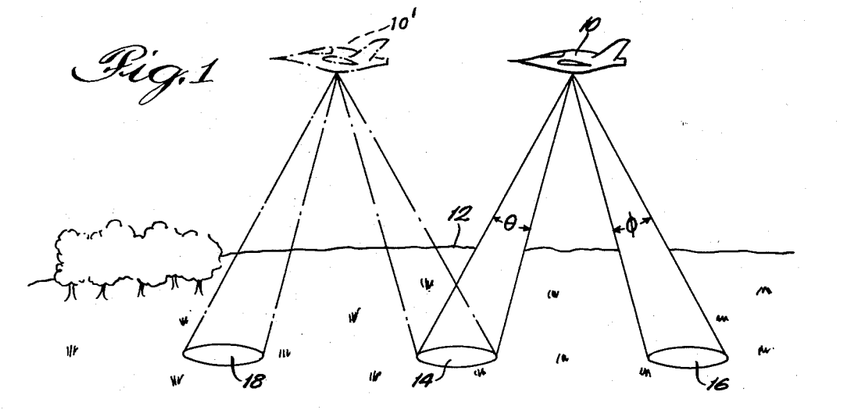
FIGURE 1 is a pictorial representation of the invention as utilized in an aerial vehicle for measuring ground speed.

Operation of the invention advantageously may be illustrated as shown in FIGURE 1 of the drawing wherein an aerial vehicle 10 is shown in one position relative to the terrain 12, as represented by the full line figure, and is again shown, as represented by the broken figure, in a symbolic fashion to illustrate the flight of the aerial vehicle during a pre-determined period of time. In accordance with a feature of this invention, the aerial vehicle 10 is provided with a pair of spaced radiation responsive devices or sensors which are positioned at the under portion of the vehicle so as to view separate areas of terrain beneath the aircraft.

One sensor accepts radiations from an area of terrain 14, forward of nadir, through the cone of view $\theta$, and the second sensor accepts radiations from an area of terrain 16, rearward of nadir, through the cone of view $\phi$, which preferably has an angle of acceptance identical to that of the cone of view $\theta$.

As the aerial vehicle 10 moves from its first position to the broken line position represented at 10' the output of the two sensors varies in accordance with the radiations received from the terrain 12 and consequently, a plurality of individual wave forms are generated at the output of the sensors. When the aerial vehicle has attained the second position, as represented by the broken line figure 10', the rearward sensor views the identical area of terrain 14 that had been viewed by the forward sensor in the first position of the vehicle. At this instance of time, the output signal from the rearward sensor should closely approximate the output signal previously generated by the forward sensor with, of course, minor variations due to drift, the different aspect of view and similar type conditions.

Those skilled in the art will now appreciate that the two nearly identical signals generated first by the forward sensor and then by the rearward sensor will be separated by the time period required for the aerial vehicle to traverse the distance from the first to the second viewing positions. This time period varies inversely as the angular ground speed because the aerial vehicle essentially is traversing about the area of terrain 14 the angle subtended by the line between the first and second positions, more rapid traverse of the angle being indicated by a shorter time period.

It is a further feature of this invention that a time delay unit, suitably arranged with appropriate drive and indicating means, may be utilized to bring the two sensor output signals into time coincidence. It is a still further feature of this invention as described in greater detail below, that the energy, displacement or speed necessary to achieve such time coincidence may be used to indicate the time separating the two sensor output signals and therefore this measurement may be used to indicate the average angular ground speed during the time period.

If a direct indication of linear ground speed is desired, then in accordance with the invention, the two radiation responsive devices or sensors are arranged in spaced parallel relationship so that the two sensors will pass in a sequential manner over individual areas of terrain. Under these operating conditions the sensor signal output may be used to indicate the linear ground speed with the same type of measuring apparatus used for the indication of angular ground speed and thus no other alterations are necessary to change from one mode of operation to the other.

Figure 2:
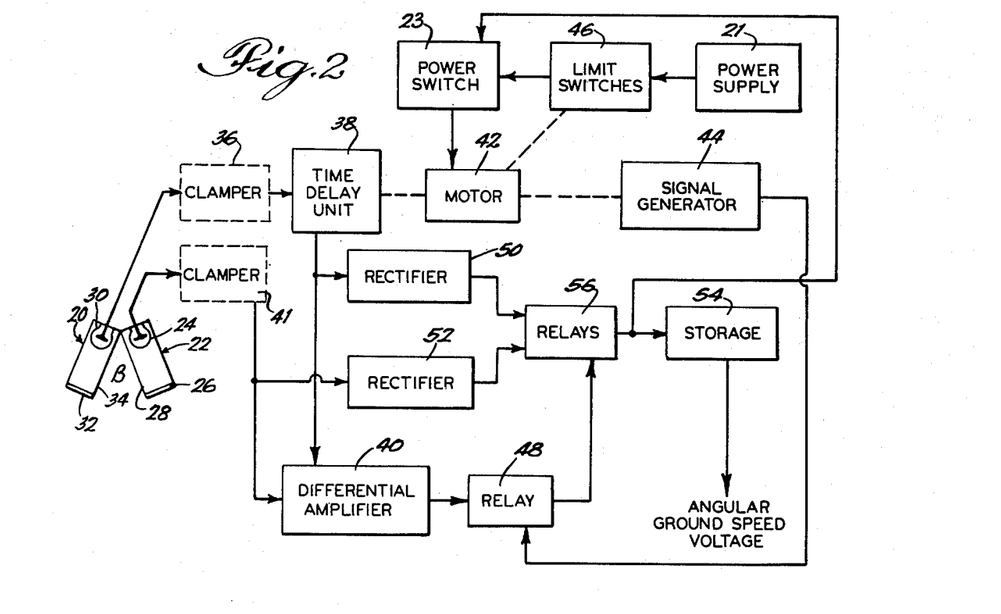
FIGURE 2 is a block diagram representation of one embodiment of the invention, particularly for use in measuring angular ground speed.

The circuit diagram shown in block form in FIGURE 2 of the drawing illustrates one embodiment of the invention operable as described in conjunction with FIGURE 1, and particularly suited for providing indications of angular ground speed. The two radiation sensitive devices or sensors 22 and 20 are shown in spaced-apart co-planar relation having an included angle $\beta$ therebetween. One sensor views an area rearward of nadir and comprises a radiation sensitive element, as for example, a photoelectric cell 24 located at the focus of an objective lens 26, said photoelectric cell 24 and said objective lens 26 being enclosed in an opaque housing 28. The other sensor, attached to view an area forward of nadir also comprises a radiation sensitive element such as the photoelectric cell 30 which is located at the focus of the objective lens 32, cell 30 and lens 32 both being enclosed in an opaque housing 34.

The output signal from the forward sensor 20 is fed through clamper 36 and through the time delay unit 38, where it is stored for a determinable period of time and then it is directed to a null indicating device such as the differential amplifier 40. The output signal from the rearward sensor 22 is fed through the clamper 41 directly to the differential amplifier 40 and, in accordance with the well known operation of differential amplifiers, the two signals applied to amplifier 40 are compared and an output will be provided from the differential amplifier 40 in accordance with the time spacing between the signals applied thereto.

As shown in greater detail below, the clamper stages 36 and 41 through which the sensor outputs are applied advantageously are each comprised of an operational amplifier with clamping, diode feedback to the end that the varying voltages from the sensor outputs are converted to a train of essentially rectangular pulses having a fixed amplitude and a variable duration. As pointed out in greater detail below, the output pulse from the clamper stages is negative when the slope of the input wave is positive and conversely, the pulse from the output is positive when the slope of the input pulse is negative.

At this point it can be understood that when the time delay period of the time delay unit 38 is properly adjusted, the signal from the forward sensor 20 as fed to the differential amplifier 40, will closely approximate the signal from the rearward sensor 22 as fed to the differential amplifier 40, and consequently, there will be no output from the differential amplifier 40. Thus the output from the differential amplifier 40 will be dependent upon the time coincidence of sensor output signals achieved by the time delay unit 38, with nulls indicating coincidence and other outputs, in the proximate vicinity of null, indicating errors in coincidence.

In accordance with one advantageous embodiment of this invention, the time delay period of time delay unit 38 may be adjusted by a suitable drive motor 42 coupled to the time delay unit 38, and the angular ground speed may be indicated by signals from a signal generator 44 coupled to the drive motor 42. As pointed out below, signal generator 44 advantageously may take the form of a tachometer, a potentiometer, a synchro mechanism, or any other apparatus capable of converting a mechanical displacement into an electrical indicating signal.

It will be appreciated that since the output wave forms from sensors 20 and 22 are generally irregular and non-repetitive in nature, the error output signal from differential amplifier 40 will contain no phase or sense information. It is still another feature of this invention that special provision is made for operating drive motor 42 so that it may be properly able to adjust the time delay unit 38 for both increased and decreased signal storage periods.

One such provision takes the form of utilizing a drive motor 42 which deliberately oscillates about or hunts for the proper time delay needed to achieve a time coincidence of the output signals from the two sensors. For example, if the approximate range of values of angular ground speed to be encountered and the angles of inclination of the two sensors are known, the extreme values of time-delay which will be needed can be estimated. Under these conditions, drive motor 42 which operates exclusively to decrease the time delay can be controlled as by the limit switches 46 to create time delays only within this range. Thus with sensors 20 and 22 operating, the drive motor 42 is started from its static position. As the drive motor 42 accelerates, it decreases the time-delay between the two sensor signals and it will continue to decrease the time-delay until a coincidence in sensor signals is achieved. As explained heretofore, the existence of a coincidence between the two sensor outputs is signalled by a null output from the differential amplifier 40. This null output is detected by the relay 48 to operate a power switch 23 for removing the accelerating force from the drive motor 42. Due to the inertial forces present, the accelerating force cannot be removed instantaneously; and the speed of drive motor 42 continues to increase. Consequently, coincidence between the two sensor signals is destroyed. Shortly thereafter frictional forces slow down the drive motor 42 and eventually a new coincidence and therefore a new null is established. This second null re-applies the accelerating force to the motor 42 through relay 48 and power switch 23. However, the inertial forces present in the slowing down of the drive motor 42 cause the motor to be slowed sufficiently to destroy the coincidence before the reapplied accelerating force can exert its influence. When the accelerating force starts to act upon the motor 42 it will once again be accelerated to establish a new null and the above-described oscillatory or hunting cycle is repeated with the drive motor constantly accelerating and decelerating around the null point.

Now it will be understood by those skilled in the art that fictitious nulls can sometimes be caused by a prolonged loss of sensor output signal due, for example, to lack of terrain contact, intervening clouds, or other similar phenomena. Since fictitious nulls or terrain signals containing only small percentages of usable information can effect the proper operation of the drive motor 42, the rectifiers 50 and 52 are provided at the output of time-delay unit 38 and clamper 41 respectively to prevent disturbance of a proper operation of the drive motor 42 and to prevent the application of faulty information on the storage device 54 as described below.

Advantageously, limit switches 46, which conveniently may be centrifugally controlled, are provided with the power switch 23 to prevent run-away acceleration or complete deceleration of drive motor 42 due to the loss of either sensor signal. Thus the drive motor 42 will operate between the limit values prescribed by the limit switches 46 until proper sensor signals are once again available.

Since the rotational speed of the drive motor 42 is directly proportional to the angular ground speed at each instant when a true null occurs, the signal generator 44 coupled to the drive motor 42 may be utilized to generate a voltage proportional to the speed of the drive motor and therefore proportional to the angular ground speed. When such a true null occurs the normally closed contacts of relay 48, which hereto have been held open by an output signal from the differential amplifier 40, close to allow the output of the signal generator 44 to be applied to the relays 56, which in one advantageous embodiment of the invention may take the form of a pair of relays connected in series as shown in greater detail below.

Advantageously, the relays 56 include normally open contacts which are adapted to be held closed by the signals from both of the sensors 20 and 22 as modified by the rectifiers 50 and 52 respectively. The loss of a signal from either sensor will open the contacts of relay 56 and thereby prevent the output of the signal generator 44 from entering the storage device 54 and from operating the power switch 23. Thus it can be seen that the relays 56 serve to discriminate between true and fictitious nulls by transmitting the output of relay 48 only at the times when both signals are present.

The storage device 54, which advantageously may take the form of a capacitor-and-operational amplifier, accepts the signals transmitted by the relays 56 and propagates the voltage received until a new null establishes a new voltage for further propagation. In accordance with the description given above, it can be seen that propagated voltage is proportional to the angular ground speed and can be used for indicating this factor.

Figures 3, 4, 5:
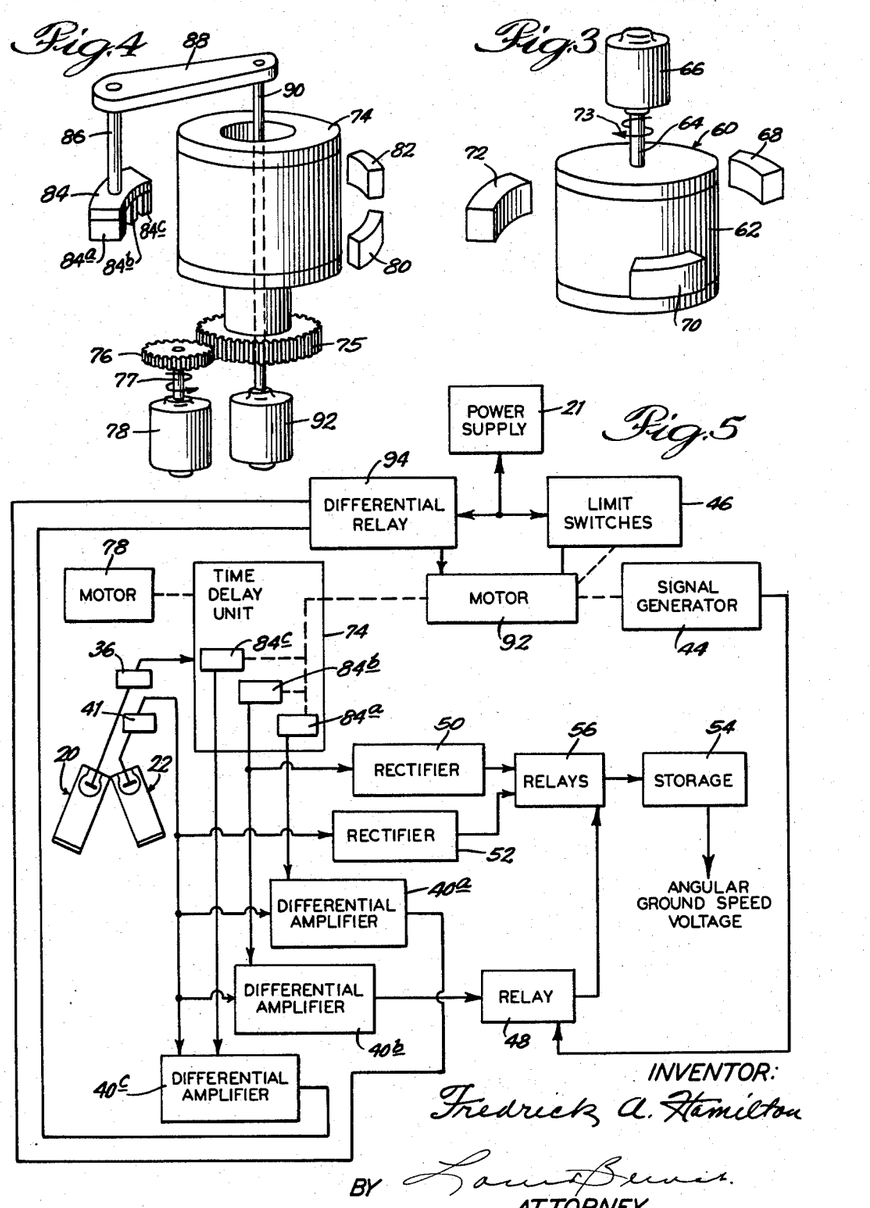
FIGURES 3 and 4 are pictorial representations of two magnetic drum embodiments of variable time delays which advantageously may be utilized in the invention.
FIGURE 5 is a block diagram representation of another circuit embodiment of the invention, particularly for use with the magnetic drum assembly of FIGURE 4.

The time delay unit 38 may comprise any suitable storage device in which the cyclic time period of operation may be varied in a selective manner. The preferred embodiment of time delay unit 38 is shown in FIGURE 3 of the drawing and comprises a rotatably mounted drum 60, the peripheral surface of which is coated with a magnetic recording material 62, as for example, the oxides of iron. Drum 60 is coupled by a shaft 64 to a variable speed motor 66. A plurality of magnetic heads 68, 70 and 72 are positioned in spaced relationship around the periphery of drum 60 and the drum is rotated in a clockwise direction as shown by the arrow 73 by the driving motor 66. The three fixed magnetic heads may be selected such that magnetic head 68 is a playback head, magnetic head 70 is an erase head and magnetic head 72 is a recording head.

In the operation of the invention, the output of the forward sensor 20 is applied through the clamper 36 to the recording head 72 and is recorded on the magnetic surface 62 of the rotating drum 60. The recorded signal is played back to the null indicating differential amplifier 40 by means of the playback head 68 and the recorded signal is erased from the drum by the erase head 70. It will be appreciated by those skilled in the art that under these conditions the time delay for the output signals from the forward sensor 20 is determined by the angular speed of the magnetic drum 60 and the displacement between the recording head 72 and the playback head 68. Since in this embodiment, the magnetic heads advantageously are fixed in the position relative to the magnetic drum and to each other, the time delay may be varied by varying the angular speed of the magnetic drum. The angular speed in turn is dependent upon the speed of rotation of the motor 66. As explained heretofore with respect to FIGURE 2, the motor may be accelerated or decelerated in an oscillatory manner to obtain an angular speed which will provide a coincidence between the sensor signals and therefore a null from the differential amplifier 40. Advantageously, when the time delay takes the form of a variable speed magnetic drum of the type shown in FIGURE 3, the signal generator 44 may take the form of a tachometer suitably coupled to the shaft of the drive motor 66.

An alternative form of the time delay unit 38 is shown in FIGURE 4 of the drawing. In this embodiment a magnetic drum 74 is coupled through a pair of driving gears 75 and 76 to the shaft 77 of a constant speed drive motor 78. A recording magnetic head 80 and an erasing magnetic head 82 are arranged in an adjacent fixed relationship and the playback magnetic head 84 is rotatably mounted adjacent the magnetic drum 74 as by means of the linking members 86 and 88 coupled to the shaft 90 of the magnetic head adjusting motor 92. As shown in FIGURE 4, magnetic drum 74 may be provided with a central opening such that the elongated shaft 90 of a reversible motor 92 extends therethrough for connection to the linking member 88.

In the embodiment of FIGURE 4, the drive motor 78 rotates the magnetic drum 74 at constant speed and as the period of time delay is dependent upon the displacement between the recording head 82 and the playback head 84, this period of time delay may be varied in a selective manner by energizing the motor 92 to adjust the relative position of the playback head 84 as desired. Also in the embodiment of FIGURE 4 the signal generator 44 advantageously takes the form of either a synchro or a potentiometer suitably connected to the shaft of the reversible motor 92.

In accordance with a further embodiment of this invention the playback head 84 takes the form of three separate closely arranged playback heads, 84a, 84b, and 84c and the sensitivity of adjustment of the time delay unit shown in FIGURE 4 may be increased through the use of the circuit shown in block form in FIGURE 5. The circuit of FIGURE 5 bears some similarity to the circuit of FIGURE 2 and like reference numerals have been used to indicate like components. Thus the sensors 20 and 22 apply their signal outputs through clampers 36 and 41, respectively, to a time-delay unit which in this embodiment comprises the magnetic drum 74 driven by the constant speed motor 78 and magnetic playback means which comprise the plurality of closely spaced heads 84a, 84b and 84c. The position of the playback heads relative to the recording head 82 is adjusted in a selective manner by the motor 92.

The output of sensor 22 is applied to the differential amplifiers 40a, 40b and 40c. In addition, the output of magnetic playback head 84a is applied to the differential amplifier 40a, the output of the magnetic playback head 84b is applied to the differential amplifier 40b, and the output of the magnetic playback head 84c is applied to the differential amplifier 40c.

The outputs of differential amplifiers 40a and 40c are applied to a differential relay 94 connected to the adjusting motor 92 for the three playback heads. The output of the differential amplifier 40b is applied to relay 48 which receives another input from signal generator 44 and applies an output to the relays 56. The outputs from the sensor 22 and the magnetic playback head 84b are applied to the rectifiers 52 and 50 respectively, which rectifiers in turn apply their output to the relays 56. In accordance with the operation of the above described embodiment it can be seen that the frequency of inputs to the storage device 54 may thereby be greatly increased. In the circuit shown in FIGURE 5 the operation of motor 92 is controlled by the outputs of the differential amplifiers 40a and 40c through the differential relay 94 connected in parallel with the limit switches 46 rather than by a power switch of the type illustrated as 23 in FIGURE 2. Thus, a null produced at the leading playback head 84a would indicate too short a time delay and would through differential relay 94, reverse the motor 92 to increase the delay. A null transmitted at playback head 84b would indicate a coincidence in sensor signals, while a null at the lagging playback head 84c would indicate too great a time delay and through the differential relay 94 would call for another reversing of the motor 92 but in a direction so as to reduce the time delay.

Figure 6:
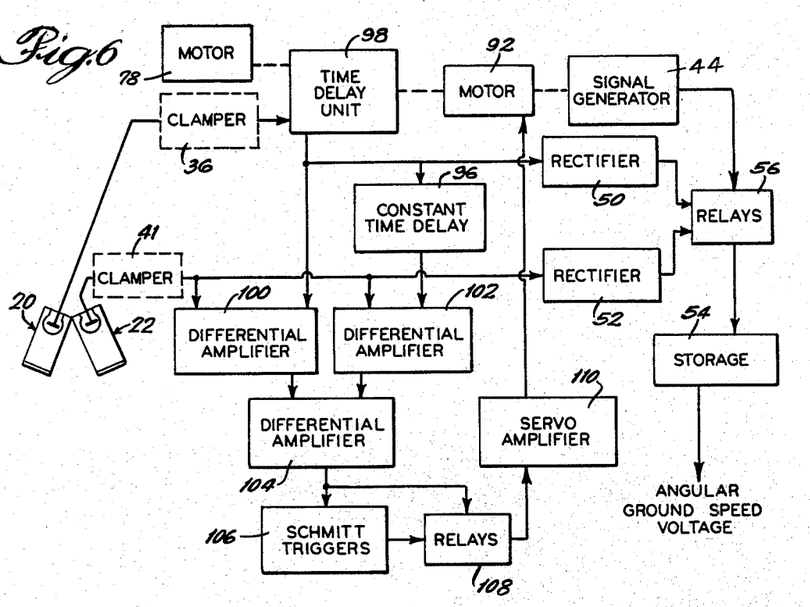
FIGURE 6 is a block diagram representation of still another circuit embodiment of the invention.

A further embodiment of the invention is shown in block diagram form in FIGURE 6 of the drawing. It is a feature of the circuit shown in FIGURE 6 that true servo operation of the reversible drive motor 92 can be secured by twice comparing a single signal from the rearward sensor 22 with a signal from the forward sensor 20. Advantageously the separate manifestations of the twice compared signal from the forward sensor 20 may be spaced in time by some fixed interval as through a constant time delay unit 96. In one advantageous embodiment of the invention this time interval was found to be conveniently in the magnitude of 2 milliseconds.

Those skilled in the art will readily appreciate that the constant time delay unit 96 may take the form of either electrical or mechanical means suitable to provide a pre-determined delay period. For example, suitable mechanical means may comprise dual playback heads spaced by a distance sufficient to obtain the desired time delay. Suitable electrical means may take the form of any type of electrical delay circuit and conveniently may take the form shown in the schematic diagram of FIGURE 7 described hereinbelow. When the constant time delay 96 is in the electrical form, then the playback head of the time delay unit 98 becomes a single head.

In the operation of the circuit of FIGURE 6, the output signal from the rearward sensor 22 is applied to the differential amplifiers 100 and 102 respectively and to the rectifier 52. The output from the forward sensor unit 20 is applied to the variable time delay unit 98, which in turn applied its output directly to differential amplifier 100 and to rectifier 50 and indirectly to the differential amplifier 102 through the constant time delay 96. The differential amplifiers 100 and 102 apply their output to differential amplifier 104, which in turn applies an output to the Schmitt triggers 106 and to the relays 108. The output from Schmitt triggers 106 is also applied to the relays 108 and the output from relays 108, in turn, is applied through the servo amplifier 110 to the drive motor 92.

The magnitude of the signal output from the differential amplifier 102, relative to the signal from differential amplifier 100, indicates whether the time delay is too large or too small. For example, with the exception of a small region created by the time period of a constant time delay 96, when the signal from differential amplifier 102 exceeds that of differential amplifier 100, the time delay is too great and reversible motor 92 will be driven by the servo amplifier 110 to reduce the time delay. Conversely, when the signal from differential amplifier 100 exceeds that of differential amplifier 102, the time delay is too small and the reversible motor 92 will be driven by the servo amplifier 110 to increase the time delay.

As stated above it is necessary that sense information be present for the regions removed from the null point and in accordance with a feature of this invention a pair of Schmitt triggers 106 is provided for this purpose. The Schmitt triggers 106 serve to operate the relays 108 to substitute fixed voltages for the null difference signal from differential amplifier 104 when that signal departs from the null point. Servo operation of the motor 92 is thereby insured as will be explained below with reference to the schematic diagram of FIGURE 7 and the wave form diagrams of FIGURES 8, 9 and 10.

Figure 7:
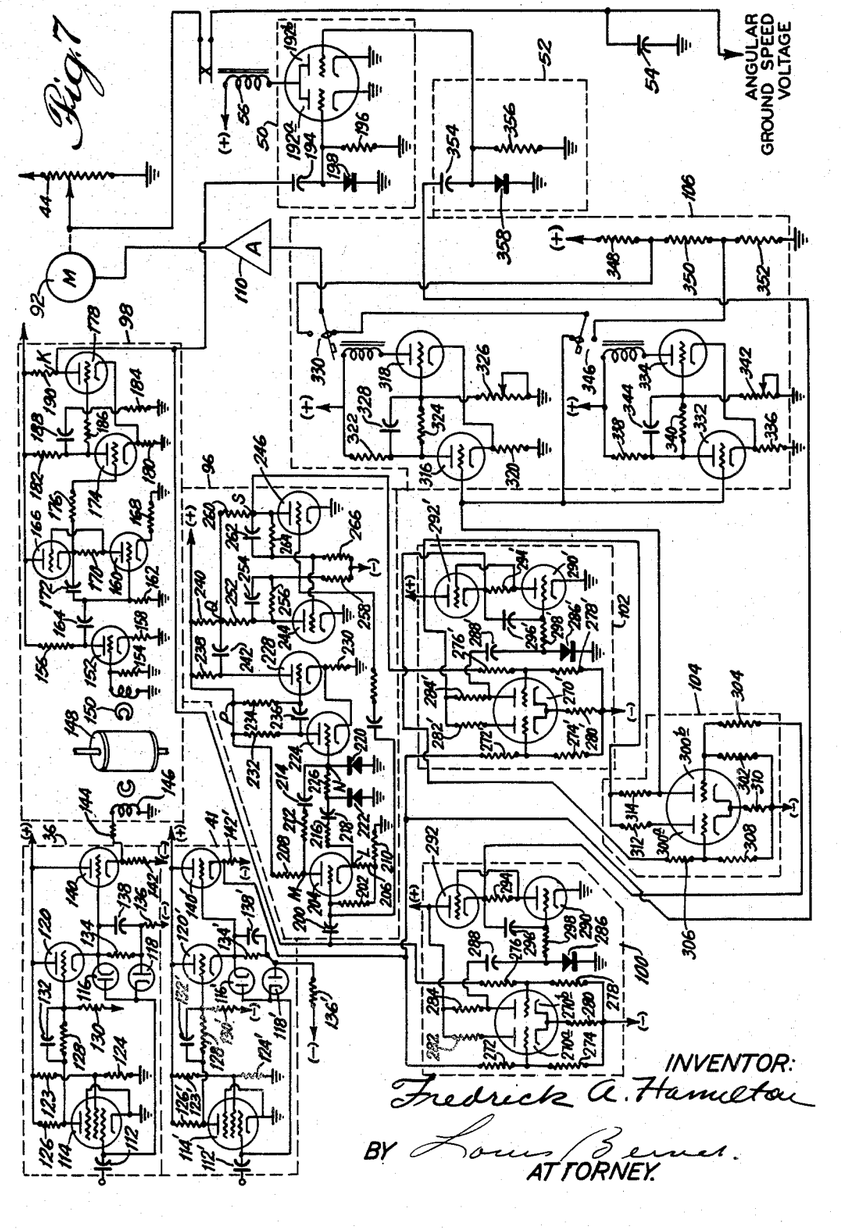
FIGURE 7 is a schematic diagram of the circuit shown in FIGURE 6.

A detailed schematic diagram of the circuitry comprising the blocks of the FIGURE 6 circuit is shown in FIGURE 7 of the drawing.

As shown therein, the output signal from the forward sensor unit 20 is applied to the variable time delay unit 98 through a coupling condenser 112 and the clamping circuit 36 comprised of pentode 114, diodes 116 and 118, and triode 120. Pentode 114 acts as an amplifier, being supplied with screen voltages through resistors 122 and 124 and being loaded through resistor 126. The signal appearing at the plate of pentode 114 is applied through the voltage divider comprised of resistors 128 and 130 to the grid of triode 120.

The signal appearing at the cathode of triode 120 is fed back to the grid of pentode 114 through diodes 116 and 118; resistors 134 and 136 constituting the load of triode 120 with capacitor 138 providing filtering. Triode 140 functions as a cathode follower to the output of triode 120, resistor 142 being the cathode load. Those skilled in the art will understand that in this manner, the output signal from sensor unit 20 is amplified and clamped between the limits established by the diodes 116 and 118.

The signal appearing at the cathode of triode 140 is applied to the magnetic recording head 146 through resistor 144, which acts as a constant current source.

This signal is thence recorded on the magnetic drum 148 to effect a time delay and is subsequently played back through the magnetic playback head 150 to the grid of triode 152. Resistor 154 functions as the load for playback head 150.

Triode 152 acts as an amplifier stage; and in keeping with this purpose, resistors 156 and 158 are provided for load and bias respectively. The amplified signal appearing at the plate of triode 152 is applied to the grid of triode 160 through coupling resistor 162 and coupling capacitor 164. Triode 160, in conjunction with triode 166, constitutes what is known in the art as a bootstrap amplifier. Resistor 168 supplies bias while resistor 170 provides load. Since playback serves to differentiate the original signal, provision must be made to integrate and restore the now amplified signal from playback head 150.

Arrangement is, therefore, made to feed the signal at the cathode of triode 166 to the grid of triode 160 through capacitor 172.

The integrated signal at the cathode of triode 166 is coupled to the grid of triode 174 through isolating resistor 176. Triodes 174 and 178 have a common biasing resistor 180 and constitute a Schmitt trigger circuit. The Schmitt trigger circuit here is employed as an aid in squaring the signal pulses, although those skilled in the art will appreciate that this end may be equally as well achieved by amplifying and clipping, for example. Resistor 182 provides load for triode 174.

Whereas the signal appearing at the plate of triode 174 is coupled to the grid of triode 178 through the network comprised of resistors 184 and 186 and capacitor 188, the signal appearing at the plate of triode 178 is applied to the constant time delay unit 96, rectifier 50, and differential amplifier 100. Resistor 190 provides load for triode 178.

The signal output of triode 178 is coupled to the grid of section 192a of the twin triode 192 through capacitor 194 and grid resistor 196. Since semi-conductor diode 198 rectifies the signal impressed on the grid of section 192a, any signal which appears keeps section 192a cut off.

Figure 8:
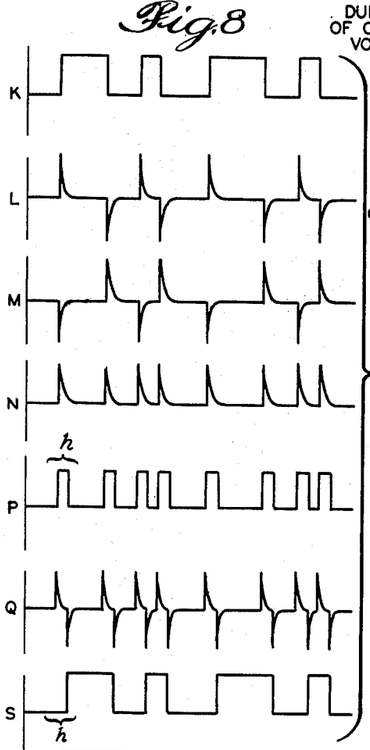
FIGURES 8, 9, 10 and 11 are wave forms illustrative of the operation of the circuits shown in FIGURES 6 and 7.

The signal output of triode 178, which takes the form of a series of rectangular pulses such as is shown at K in FIGURE 8, is applied to the constant time delay unit 96 through coupling capacitor 200 and grid resistor 202. By proper selection of the values of the resistor 202 and capacitor 200, differentiation of the signals from triode 178 is obtained. The signals shown in FIGURE 8 as M and L result.

Triode 204 functions as a phase splitter and inverter with resistor 206 providing bias, resistor 208 providing plate load, and resistor 210 cathode load. The signals appearing at the plate and cathode of triode 204 are identical, but the signal at the plate is inverted as compared with the input signal. The plate and cathode signals from triode 204 are passed respectively by resistor 212 with capacitor 214, and resistor 216 with capacitor 218.

The differentiated signals M and L are rectified by semiconductor diodes 220 and 222 respectively, the rectified signals being passed to the grid of triode 224 by isolating resistor 226. Rectification assures that only the positive leading edges of the pulses are applied to triode 224.

Triode 224 and triode 228 constitute a monostable multivibrator having a common cathode resistor 230. Resistor 232 provides plate load for triode 224 while the coupling elements, resistor 234 and capacitor 236, apply the output signal of triode 224 to the grid of triode 228. These coupling elements provide control of the period of delay. For example, as used in one illustrative embodiment of the invention, when capacitor 236 takes a value of 0.02 microfarad and resistor 234 takes a value of 1.0 megohm, a 2 millesecond delay is obtained. The output of triode 228 shown as P in FIGURE 9 appears at the plate thereof and at load resistor 238. This output signal takes the form of a series of pulses, the duration of each of which is preselected to the desired value of time delay, $h$.

The output of triode 228 is applied through coupling resistor 240 and coupling capacitor 242 and differentiated thereby to pulses shown as Q. Pulses Q serve as triggering signals to triodes 244 and 246 which constitutes a bi-stable multivibrator. Because the bi-stable multivibrator can take either of two conditions, the output of capacitor 200 is by-passed through resistor 248 and capacitor 250 to the grid of triode 246 in order to apply an input pulse thereto immediately prior to the delayed trigger pulse from the plate of triode 244 and thereby establish the polarity of triode 246 proper to ensuring phase agreement between its input and its output. A bi-stable multivibrator triggered in this manner responds only to negative-going signals. Thus, the output of the bi-stable multivibrator which appears at the plate of triode 246 is a signal such as shown at S in FIGURE 8. Signal S is identical to signal K, the input to constant time delay unit 96, but delayed by the preselected value $h$.

Triode 244 is provided with a plate load resistor 252, and coupling elements, capacitor 254 and resistors 256 and 258. Triode 246 is provided with a plate load resistor 260, and coupling elements, capacitors 262 and resistors 264 and 266.

The output signal from the rearward sensor unit 22 is applied through a coupling condenser 112′ to the clamping circuit 41 comprised of pentode 114′, diodes 116′ and 118′, and triode 120′. Clamping circuit 41 is identical to clamping circuit 36; and like elements serving like functions as previously described have been designated by like numerals, the "prime" notation identifying elements of clamping circuit 41.

The output appearing at the cathode of triode 140′ is applied to differential amplifier 100, rectifier 52, and differential amplifier 102. In differential amplifier 100, the output of triode 140′ is applied to the grid of section 270a of twin triode 270 and is there compared with the output of triode 178 which is applied to the grid of section 270b. The difference signal appears at the plate of section 270b.

The outputs of triodes 145 and 178 are applied to twin triode 270 through voltage dividers respectively comprised of resistors 272 and 274, and resistors 276 and 278. The two cathodes of twin triode 270 have a common resistor, resistor 280. Resistor 282 provides plate load for section 270a whereas resistor 284 provides plate load for section 270b.

The difference signal from twin triode 270 is rectified by semi-conductor diode 286, which passes positive pulses to ground with coupling to the grid of triode 290 being provided by capacitor 288.

Triodes 290 and 292 comprise a bootstrap amplifier having a load resistor 294. In order to integrate the now amplified difference signal from twin triode 270, arrangement is made to feed the signal appearing at the cathode of triode 292 to the grid of triode 290 through the integrating network composed of capacitor 296 and resistor 298.

The output pulse train from the constant time delay unit 96 appearing at the plate of triode 246 is applied to differential amplifier 102. Differential amplifier 102 is identical to differential amplifier 100 with the exception that amplifier 102 receives inputs from constant time delay 96 and clamper 41, whereas amplifier 100 receives inputs from time delay unit 98 and clamper 41. Therefore, like numerals have been employed to denote like elements in these amplifiers, the "prime" notation being employed to distinguish elements of amplifier 102.

The integrated outputs appearing at the cathodes of triodes 292 and 292′ are applied respectively to the grids of sections 300b and 300a of twin triode 300. These integrated outputs are applied through voltage dividers comprised of, respectively, resistors 302 and 304 and resistors 306 and 308. Twin triode 300 has a common cathode resistor, resistor 310. Resistor 312 provides plate load for section 300a while resistor 314 provides plate load for section 300b.

In accordance with a feature of this invention, the magnitude of the signal from amplifier 102, relative to the magnitude of the signal from amplifier 100 indicates whether the time delay developed by unit 98 is too great or too small. For example, with the exception of a narrow region created by the interval of constant time delay 96, when the signal from amplifier 102 exceeds that of amplifier 100, the time delay is too great and reversible drive motor 92 will be driven by servo amplifier 110 to reduce the time delay; and vice versa.

In order to provide sense information in regions removed from the null point, as sensed by amplifier 104, there is provided a pair of Schmitt triggers 106. These operate relays 108 appropriately to substitute fixed voltages for the null difference signal from amplifier 104 when that signal departs from the region of null. Servo operation of motor 92 is thereby insured, as will be explained now with reference to FIGURES 9, 10 and 11.

Figure 9:
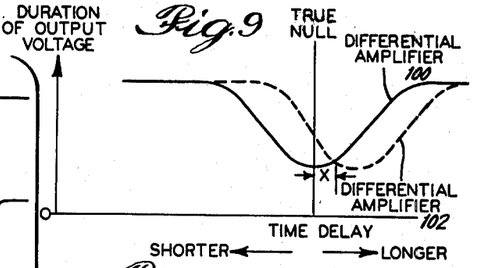

In FIGURE 9 there are shown curves representing the variations in output from amplifiers 100 and 102 as null is passed through from either too great or too small a time delay. The outputs of these amplifiers are actually D.C. voltages representative of the length of individual pulses in trains of pulses of varying duration. However, the duration of each pulse is determined by the error in time delay. Thus, the smoothed curves of FIGURE 9 indicate that the pulses from the amplifiers are of increasingly shorter duration as null is approached. The curve for amplifier 102 is identical with the curve for amplifier 100 except displaced in time therefrom by the fixed value, $h$, of constant time delay 96.

Interval $x$ is the time difference between the null at amplifier 100, the true null, and the point of zero null difference between the signals from amplifiers 100 and 102. Interval $x$ is therefore one-half of the fixed value, $h$, of constant time delay 96.

Figure 10:
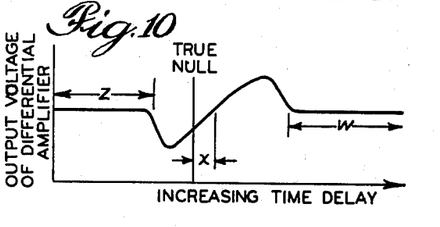
Figure 11:
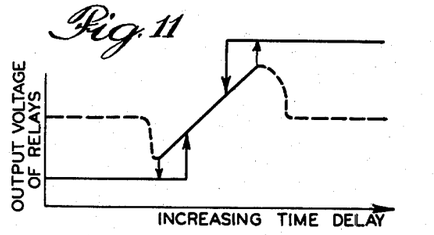

Comparing the null signal from amplifier 100 with the delayed null signal from amplifier 102 gives the null difference signal from amplifier 104 that is illustrated in FIGURE 10. This null difference signal, in the vicinity of true null output, is substantially proportional to the error in time delay and has a polarity indicative of the direction of error. Since motor 92 is driven to the null from amplifier 104 rather than the true null from amplifier 100, signal generator 44, taking the form of a potentiometer as shown or a synchro, must be adjusted to correct for interval $x$.

In areas away from null, i.e., in areas $z$ and $w$, the null difference signal from amplifier 104 does not contain either sense or magnitude information. Schmitt triggers 106 are therefore employed to substitute appropriate fixed voltages for the output of amplifier 104 as by operating relays 108. The signal shown in solid outline in FIGURE 11 results. Thus, the continued presence of a true servo signal of the proper polarity for controlling the operation of motor 92 through amplifier 110 is ensured. Furthermore, in the vicinity of a null, the servo signal is proportional to the error in time delay as described hereinabove.

More specifically, the output of twin triode 300 is directed from the plate of section 300b to the input grid of triode 316 which in conjunction with triode 318 comprises a Schmitt trigger circuit. Resistor 320 provides common cathode load for triodes 316 and 318. The amplified output of triode 316, which has a plate load resistor 322, is applied to the grid of triode 318 through the coupling network comprised of resistors 324 and 326 and capacitor 328. Conveniently, resistor 326 is made adjustable in order to regulate the level of input signal at which the trigger operates to substitute fixed voltages for the output of amplifier 104.

The plate load of triode 318 is the coil of relay 330. Since the Schmitt trigger circuit comprised of triodes 316 and 318 is arranged to operate in the region of excessive time delay, region W as shown in FIGURE 10, relay 330 is provided with normally closed contacts which pass the output signal from amplifier 104 except when the trigger circuit operates.

The output of twin triode 300 is also directed to the input grid of triode 332, triodes 332 and 334 comprising a Schmitt trigger circuit. Resistor 336 provides a common cathode load. The amplified output of triode 332, which has a plate load resistor 338, is applied to the grid of triode 334 through the coupling network comprised of resistors 340 and 342 and capacitor 344. Conveniently, resistor 342 is made adjustable in order to regulate the level of input signal at which the trigger operates to substitute fixed voltages for the output of amplifier 104.

The plate load of triode 334 is the coil of relay 346. Since the Schmitt trigger circuit comprised of triodes 332 and 334 is arranged to operate in the region of insufficient time delay, region Z as shown in FIGURE 10, relay 346 is provided with normally open contacts which pass the output signal from amplifier 104 except when the trigger circuit operates.

When the upper limit Schmitt trigger, i.e., the one comprised of triodes 316 and 318, operates, the relay 330 removes the voltage of amplifier 104 from servo amplifier 110, applying instead a fixed voltage derived from the voltage divider network comprised of resistors 348, 350 and 352. The effect is to drive motor 92 in such a direction as to decrease the time delay. Similarly, when the lower limit Schmitt trigger, that comprised of triodes 332 and 334, operates, the output of amplifier 104 is removed from servo amplifier 110 through relay 346; and a fixed voltage derived from the network comprised of resistors 348, 350 and 352 is substituted. This drives motor 92 in the opposite direction, which increases the time delay. When neither Schmitt trigger operates, amplifier 110 receives a servo signal proportional in amplitude and phase to the desired time delay, as discussed hereinabove.

The signal from forward sensor 20 is passed through time delay unit 98 to section 192a of twin triode 192. The signal from rearward sensor 22 is passed through capacitor 354 and grid resistor 356 to section 192b, rectification being achieved by semiconductor diode 358. The current of both sections of twin triode 192 passes through the coil of relay 56 whose normally closed contacts are opened when the coil is energized by a signal on both sections.

If either forward sensor 20 or rearward sensor 22 fails to produce a signal, the contacts of relay 56 open. Thereby, the signal generator 44, which is shown as a potentiometer adjusted by servo motor 92, is disconnected from signal storage capacitor 54. Capacitor 54 sustains the last received signal until both sensors again produce an output.

Figure 12:
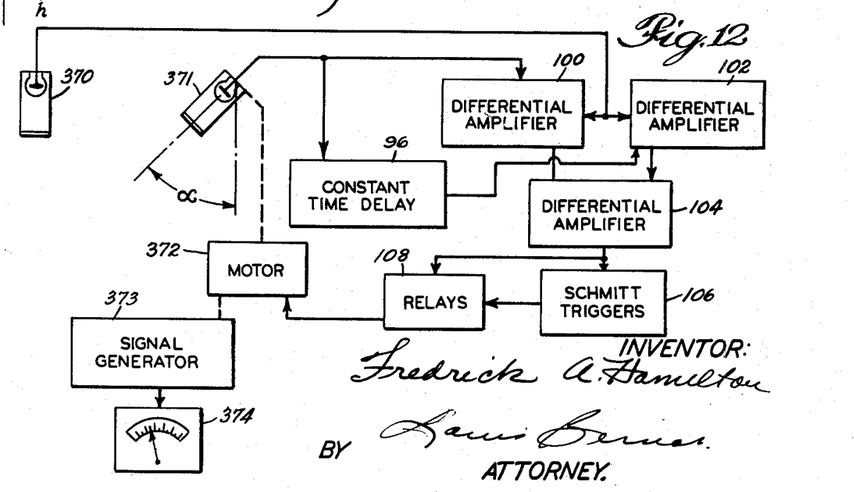
FIGURE 12 is a block diagram representation of another embodiment of the invention, particularly for use in measuring the range to a selected target.

Advantageously FIGURE 12 shows a further illustrative embodiment of the invention which provides automatic indication of aircraft terrain clearance or the range of some moving object. Two radiation responsive devices, 370 and 371, suitably comprised of a photoelectric cell located at the focus of an objective lens in an opaque housing, are arranged a fixed distance apart to establish a datum axis. Sensor 370 is located at right angles to the datum axis while sensor 371 advantageously is rotatably mounted to take various positions co-planar with sensor 370.

In accordance with an aspect of this embodiment of the invention, the angle $\alpha$ taken by sensor 371 is adjusted by means of reversible motor 372, so that the signals from the two sensors are coincident. Such coincidence indicates that both sensors are viewing the same terrain scene or the same portions of a moving object. When coincidence prevails, the value of the angle taken by sensor 371 establishes the distance from sensor 370 to the center of the area being viewed by both sensors. Signal generator 373, being corrected for interval "X" as previously described and being appropriately arranged with either sensor 371 or motor 372 as shown, therefore can provide a signal proportional to the required distance or can control meter 374 which is calibrated in suitable units of distance. For small angles of α, signal generator 373 may conveniently take the form of an arctangent potentiometer.

Servo operation of motor 372 is achieved as described hereinabove with reference to the embodiment of FIGURE 6, wherein similar circuits have been given similar reference numerals. Constant time delay 96, for the embodiment of FIGURE 12 advantageously takes electrical form.

It will be appreciated by those skilled in the art that the above described illustrative embodiments merely are exemplary of some of the uses to which the principles of the invention will be put. Thus, it is contemplated that modifications may be made in the construction and arrangement of the parts of the above-described embodiments without departing from the real spirit and scope of the invention, and it is intended to cover by the appended claims any modified forms of structures or use of equivalents which reasonably may be included within their scope.

What is claimed as the invention is:

1. Electro-optical apparatus for measuring ground velocity of an aerial vericle comprising a pair of radiation-sensitive elements, positioned in spaced apart, co-planar relation and adapted to produce individual time spaced electrical signals representative of the radiations received from a target area, optical means associated with each radiation-sensitive element for directing the radiations upon the elements, variable time delay means connected to the element first receiving the electrical signals for providing a time delay for said electrical signals, a signal comparison circuit connected to the other one of said elements and to said variable time delay means for producing a control signal whenever the signal outputs from said variable time delay means and from the second element are in coincidence, correction means connected to the variable time delay means for cyclically increasing and decreasing the time delay in accordance with said control signal to cyclically effect coincidence of the signals applied to said comparison circuit, and signal generating means associated with said correction means for generating an output signal indicative of the ground speed as represented by a condition of said correction means when the signals applied to said comparison circuit are in coincidence.

2. Electro-optical measuring apparatus comprising a plurality of radiation-sensitive elements, each adapted to produce electrical signals representative of the radiations received from a target area, said elements being positioned in spaced apart co-planar relation for causing said electrical signals to be temporally spaced when relative motion exists between said elements and a target area, variable time delay means connected to one of said elements for providing a time delay for the electrical signals received therefrom, said variable time delay means comprising a rotatable drum having a magnetizable surface and a plurality of magnetic heads operatively associated with said drum, a signal comparison circuit connected to a second one of said elements and to said variable time delay means for producing a control signal whenever the signal outputs from said storage means and from the second element are in coincidence, correction means connected to the variable time delay means for cyclically increasing and decreasing the time delay in accordance with said control signal to cyclically effect coincidence of the signals applied to said comparison circuit, and signal generating means associated with said correction means and responsive to its condition for generating a signal indicative of the condition being measured when the signals applied to said comparison circuit are in coincidence.

3. Electro-optical measuring apparatus in accordance with claim 2 wherein said correction means comprises an electric motor coupled to said drum and means for applying said control signal to said motor to cyclically increase and decrease the speed of rotation of the motor to cyclically effect coincidence between said electrical signals.

4. Electro-optical measuring apparatus in accordance with claim 2 wherein at least one of said magnetic heads is adjustable relative to said magnetic drum and said correction means comprises an electric motor coupled to said latter-named magnetic heads for cyclically adjusting said heads relative to said drum to cyclically effect coincidence between said electrical signals.

5. Electro-optical apparatus for measuring angular velocity comprising a pair of radiation-sensitive elements, each adapted to produce electrical signals representative of the radiations received from a target area, said elements being positioned in spaced apart co-planar relation and inclined in opposite directions from a datum axis for causing said electrical signals to be temporally spaced when relative motion exists between said elements and a target area, variable time delay means comprising a plurality of magnetic elements connected to the element first receiving said electrical signals for providing a time delay for said electrical signals, a signal coincidence circuit connected to the other of said elements and to said variable time delay means for producing a control signal whenever the signal outputs from said variable time delay means and from said other element are in coincidence, correction means connected to the signal storage means for cyclically varying the time delay in accordance with said control signal to cyclically effect coincidence of the signals applied to said coincidence circuit, and signal generating means associated with said correction means for generating an output signal indicative of the angular velocity as represented by a condition of said correction means when the signals applied to said signal coincidence circuit are in coincidence.

6. Electro-optical apparatus in accordance with claim 5 wherein said correction means comprises limit switches and an electric motor, the rotation of which is controlled by said control signal, and means coupling at least one of said magnetic elements to said electric motor for varying the time delay period of the variable time delay means in accordance with said control signal.

7. Electro-optical apparatus for measuring ground velocity of an aerial vehicle comprising a pair of radiation-sensitive elements, each adapted to produce electrical signals representative of the radiation received from a target area, said elements being positioned on the aerial vehicle in spaced apart, co-planar relation for causing said electrical signals to be temporally spaced when relative motion exists between said elements and a target area, optical means for directing said radiations upon said elements, variable time delay means comprising a magnetic delay device connected to one of said elements for providing a time delay for the electrical signals received therefrom, differential amplifier means connected to the second one of said elements and to said variable time delay means for producing a control signal whenever the signal outputs from said variable time delay means and from said second element are in coincidence, and correction means comprising a rotatable electric motor connected to the variable time delay means for cyclically varying the time delay period in accordance with said control signal to cyclically effect coincidence of the signals applied to said differential amplifier means.

8. Electro-optical apparatus in accordance with claim 7 further comprising signal generating means associated with said correction means for generating a signal indicative of the condition being measured as represented by a condition of said correction means when the signals applied to said differential amplifier means are in coincidence.

9. Electro-optical measuring apparatus comprising a pair of radiation-sensitive elements, each adapted to produce electrical signals representative of the radiation received from a target area, said elements being positioned in spaced apart co-planar relation for causing said electrical signals to be temporally spaced when relative motion exists between said elements and a target area, variable time delay means connected to the element first receiving said radiation for providing an adjustable time delay for the electrical signals received therefrom, a signal comparison circuit including differential amplifier means connected to said variable time delay means and to the element last receiving said radiations for producing a control signal indicative of coincidence between the signal outputs of said variable time delay means and the second element, correction means connected to the signal storage means for cyclically increasing and decreasing the time delay in accordance with said control signal to cyclically effect coincidence of the signals supplied to said comparison circuit, and signal generating means associated with said correction means and responsive to its condition for generating a signal indicative of the condition being measured when the signals supplied to said comparison circuit are in coincidence.

10. Electro-optical measuring apparatus comprising; a first and a second radiation sensitive element each adapted to produce electrical signals representative of the radiations received from a target area, said elements being positioned in spaced apart co-planar relation for causing said electrical signals to be temporally spaced when relative motion exists between said elements and a target area, variable time delay means connected to said first radiation sensitive element for providing a time delay for the electrical signals received therefrom, signal comparison and switching circuit means connected to variable time delay means and said second radiation sensitive element and responsive to the electrical signals at the output thereof for comparing the temporal spacing of the delayed and undelayed electrical signals and for selectively closing said switching means during intervals while said delayed and undelayed electrical signals are in coincidence, correction means connected to the variable time delay means for cyclically varying the time delay thereof in response to the closing of said switching means, and signal generating means associated with said correction means for generating an output signal indicative of the condition being measured as represented by a condition of said correction means, said output signal being connected through said switching means whereby said output signal is passed through said switching means only when said delayed and undelayed electrical signals are in coincidence.

11. Electro-optical measuring apparatus in accordance with claim 9 further comprising sensing means responsive to a lack of usable information in said temporally spaced signals to terminate the output signal of said signal generating means, and signal storage and propagating means connected to said signal generating means and adapted to propagate the output signal of said signal generating means last received prior to any termination thereof.

12. Electro-optical measuring apparatus in accordance with claim 10 further comprising sensing means connected to said variable time delay means and said second radiation sensitive element and responsive to a lack of usable information in the electrical signals at the output thereof to terminate the output signal of said signal generating means.

13. Electro-optical measuring apparatus in accordance with claim 12 further comprising signal storage and propagating means connected to said signal generating means through said sensing means and adapted to propagate the output signal of said signal generating means last received prior to any termination thereof.

References Cited in the file of this patent
UNITED STATES PATENTS

| | | |
|---|---|---|
| 2,297,534 | Brulin | Sept. 29, 1942 |
| 2,878,713 | Blackstone | Mar. 24, 1959 |
| 2,918,581 | Willey et al. | Dec. 22, 1959 |
| 2,967,449 | Weiss | Jan. 10, 1961 |